(12) United States Patent
Lee et al.

(10) Patent No.: US 11,356,912 B2
(45) Date of Patent: Jun. 7, 2022

(54) METHOD AND APPARATUS FOR MEASUREMENT HANDLING IN WIRELESS COMMUNICATION SYSTEM

(71) Applicant: LG ELECTRONICS INC., Seoul (KR)

(72) Inventors: Oanyong Lee, Seoul (KR); Sunghoon Jung, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/990,194

(22) Filed: Aug. 11, 2020

(65) Prior Publication Data
US 2021/0051544 A1    Feb. 18, 2021

(30) Foreign Application Priority Data
Aug. 14, 2019  (KR) .......................... 10-2019-0099650

(51) Int. Cl.
*H04W 36/00* (2009.01)
*H04W 24/08* (2009.01)
*H04W 36/38* (2009.01)
*H04W 36/32* (2009.01)

(52) U.S. Cl.
CPC ....... *H04W 36/0085* (2018.08); *H04W 24/08* (2013.01); *H04W 36/38* (2013.01); *H04W 36/32* (2013.01)

(58) Field of Classification Search
CPC ..... H04W 76/38; H04W 76/27; H04W 76/19; H04W 24/10; H04W 8/02; H04W 36/32; H04W 36/0083; H04W 36/14; H04W 76/30; H04W 36/0085; H04W 36/04; H04W 36/08; H04W 36/0058; H04W 36/0061; H04W 36/38
See application file for complete search history.

(56) References Cited

U.S. PATENT DOCUMENTS

| 2008/0220784 | A1* | 9/2008 | Somasundaram .......................... H04W 36/0085 455/437 |
| 2019/0021020 | A1* | 1/2019 | Kim ...................... H04W 48/16 |
| 2020/0260311 | A1* | 8/2020 | Jung ...................... H04W 76/27 |

OTHER PUBLICATIONS

LG Electronics Inc., "Considerations on validity area in NR," R2-1911294, 3GPP TSG-RAN WG2 Meeting #107, Prague, Czech Republic, Aug. 26-Aug. 30, 2019.
3GPPS TS 38.304 V15.4.0, Jun. 2019.

* cited by examiner

*Primary Examiner* — Nam T Huynh
(74) *Attorney, Agent, or Firm* — Dentons US LLP

(57) ABSTRACT

The present disclosure relates to a measurement handling in wireless communications. According to an embodiment of the present disclosure, a method performed by a wireless device in a wireless communication system, the method comprises: receiving information for a validity timer from a network; starting the validity timer to be expired at a first expiration time point based on the information; while the validity timer is running, performing a measurement on one or more neighbor cells and performing cell reselections; determining a mobility state based on a number of the cell reselections; adjusting, based on the mobility state, the first expiration time point to a second expiration time point of the validity timer that is currently running; and stopping the measurement upon reaching the second expiration time point.

11 Claims, 21 Drawing Sheets

METHOD AND APPARATUS FOR MEASUREMENT HANDLING IN WIRELESS COMMUNICATION SYSTEM

CROSS-REFERENCE TO RELATED APPLICATION

Pursuant to 35 U.S.C. § 119 (e), this application claims the benefit of Korean Patent Application No. 10-2019-0099650 filed on Aug. 14, 2019, the contents of which are all hereby incorporated by reference herein in their entirety.

BACKGROUND OF THE DISCLOSURE

Field of the Disclosure

The present disclosure relates to a measurement handling in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication system, the wireless device may perform a measurement for various purposes, such as cell reselection. The wireless device may receive a measurement configuration, and perform the measurement based on the measurement configuration. The measurement may be performed even the wireless device is in an idle state. Measurement configurations for different cells may be different from each other. Therefore, measurement should be properly handled when the wireless device moves along many cells.

SUMMARY OF THE DISCLOSURE

An aspect of the present disclosure is to provide method and apparatus for measurement handling in a wireless communication system.

Another aspect of the present disclosure is to provide method and apparatus for a measurement handling based on a mobility state of a wireless device in a wireless communication system.

Another aspect of the present disclosure is to provide method and apparatus for switching a measurement configuration in a wireless communication system.

Another aspect of the present disclosure is to provide method and apparatus for determining when to switch the measurement configuration in a wireless communication system.

Technical Solution

According to an embodiment of the present disclosure, a method performed by a wireless device in a wireless communication system, the method comprises: receiving information for a validity timer from a network; starting the validity timer to be expired at a first expiration time point based on the information; while the validity timer is running, performing a measurement on one or more neighbor cells and performing cell reselections; determining a mobility state based on a number of the cell reselections; adjusting, based on the mobility state, the first expiration time point to a second expiration time point of the validity timer that is currently running; and stopping the measurement upon reaching the second expiration time point.

According to an embodiment of the present disclosure, a wireless device in a wireless communication system comprises: a transceiver, a memory; and at least one processor operatively coupled to the transceiver and the memory, and configured to: control the transceiver to receive information for a validity timer from a network, start the validity timer to be expired at a first expiration time point based on the information, while the validity timer is running, perform a measurement on one or more neighbor cells and perform cell reselections, determine a mobility state based on a number of the cell reselections, adjust, based on the mobility state, the first expiration time point to a second expiration time point of the validity timer that is currently running, and stop the measurement upon reaching the second expiration time point.

According to an embodiment of the present disclosure, a processor for a wireless device in a wireless communication system is configured to control the wireless device to perform operations comprising: receiving information for a validity timer from a network; starting the validity timer to be expired at a first expiration time point based on the information; while the validity timer is running, performing a measurement on one or more neighbor cells and performing cell reselections; determining a mobility state based on a number of the cell reselections; adjusting, based on the mobility state, the first expiration time point to a second expiration time point of the validity timer that is currently running, and stopping the measurement upon reaching the second expiration time point.

Advantageous Effect

The present disclosure can have various advantageous effects.

For example, when a UE which has received information block with validity timer value and stored the information block moves fast and the UE enters normal-/medium-/high mobility state, the UE may scale the validity timer value so that the validity timer can expire earlier than before. Therefore, the UE will delete the stored information block and receive the new information block from the new serving cell. If the stored information block is maintained longer, the UE may perform unnecessary procedure such as measurement even though the stored information block is not suitable for the new serving cell, as the fast moving UE may change the serving cell frequently.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
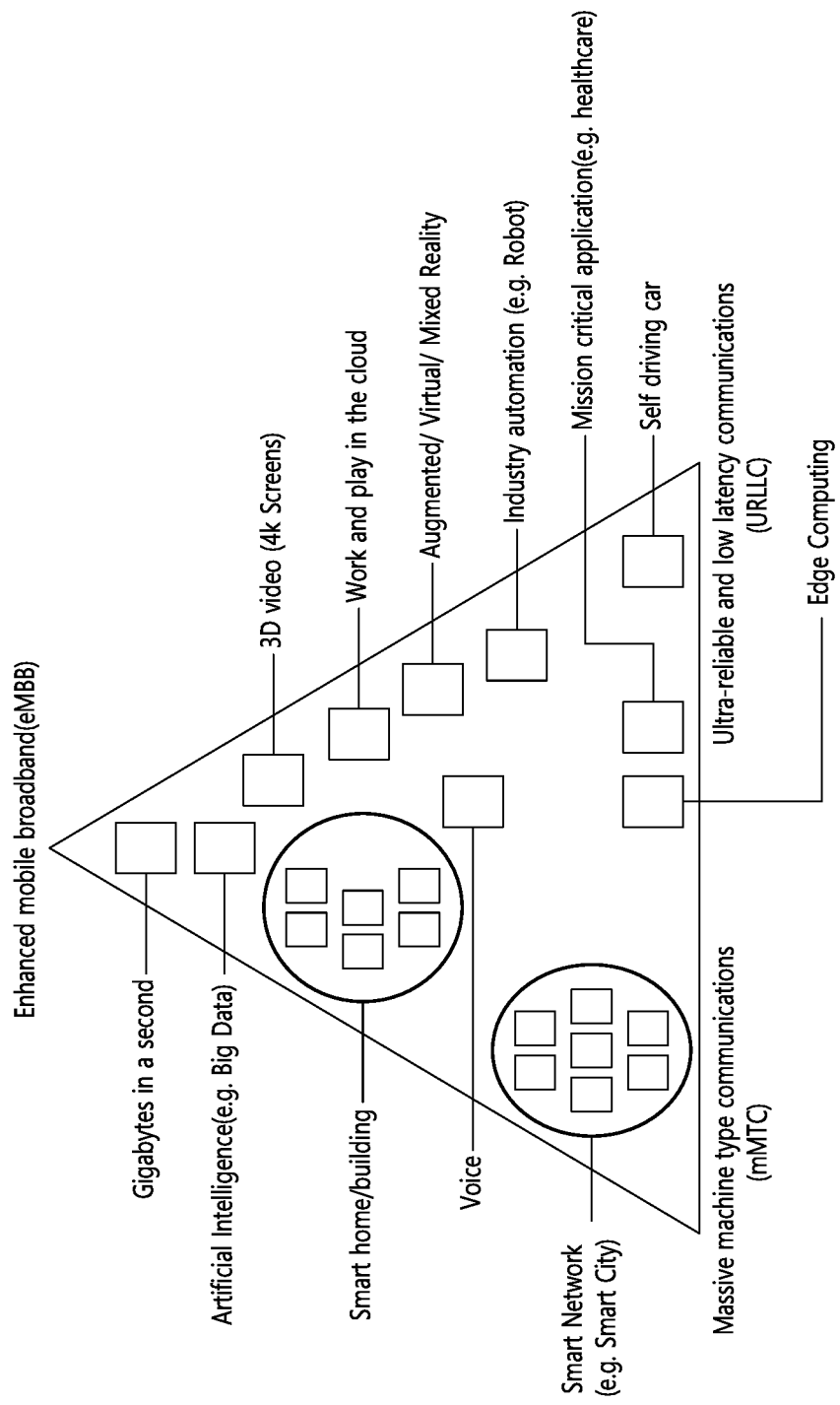
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
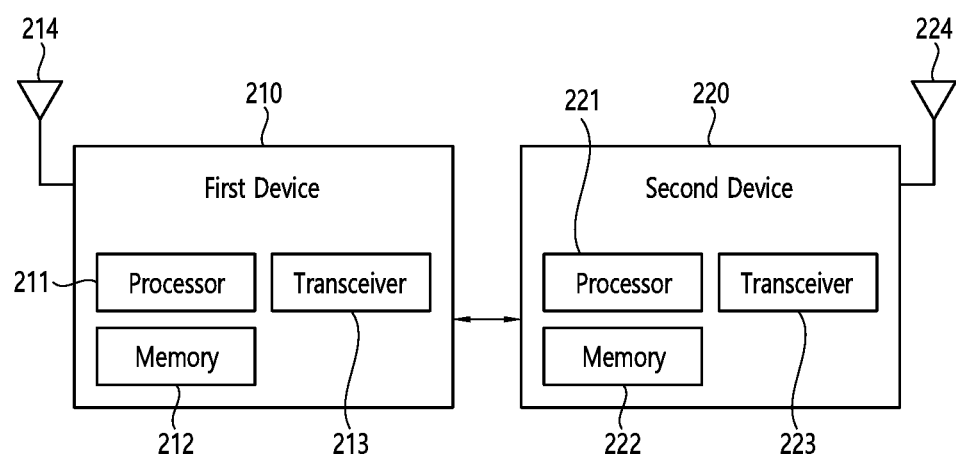
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
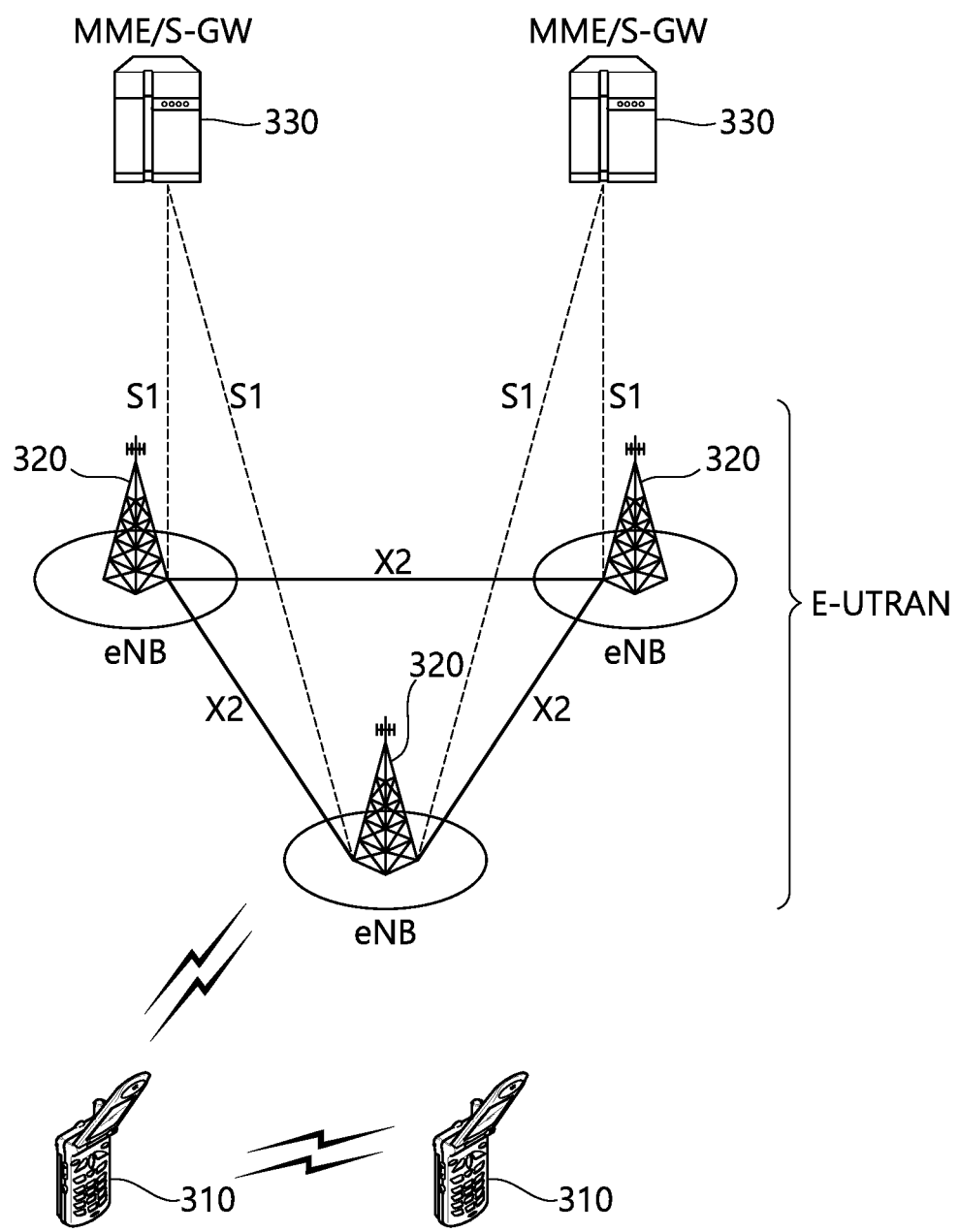
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
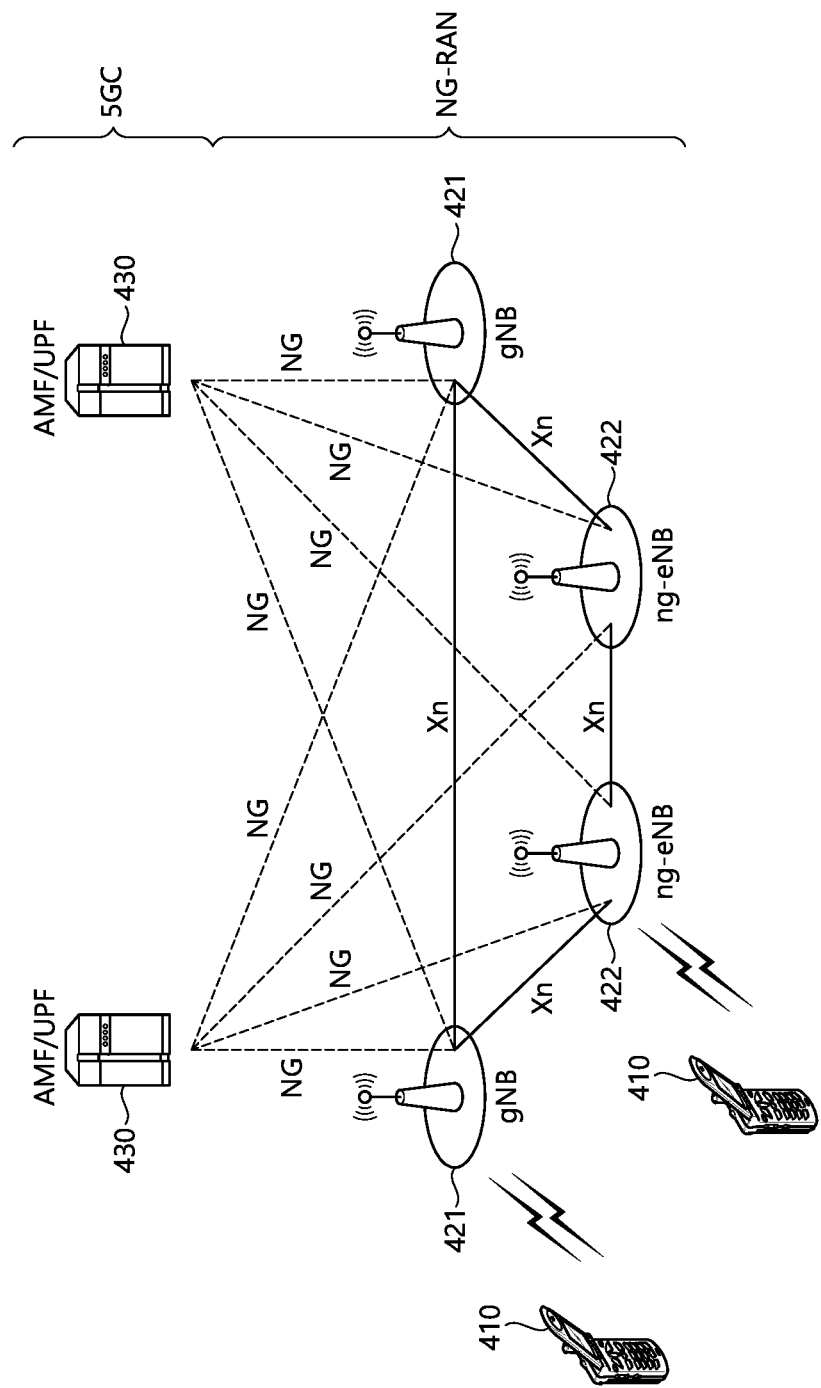
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
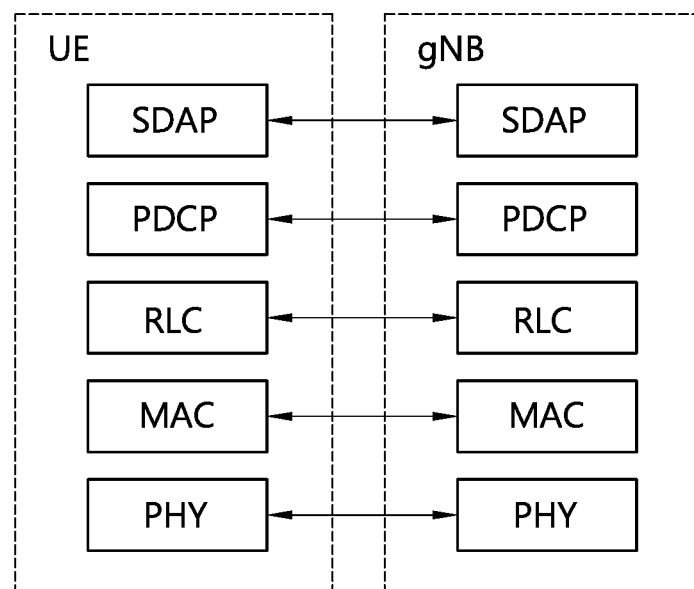
FIG. 5 shows a block diagram of a user plane protocol stack to which the technical features of the present disclosure can be applied.
Figure 6:
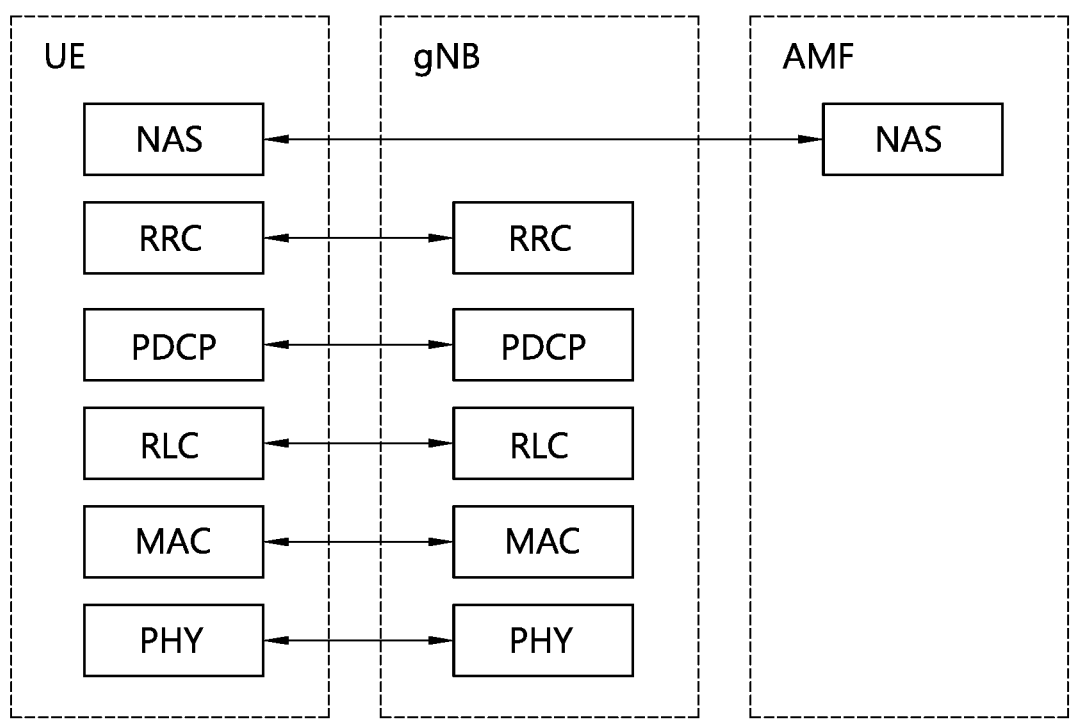
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
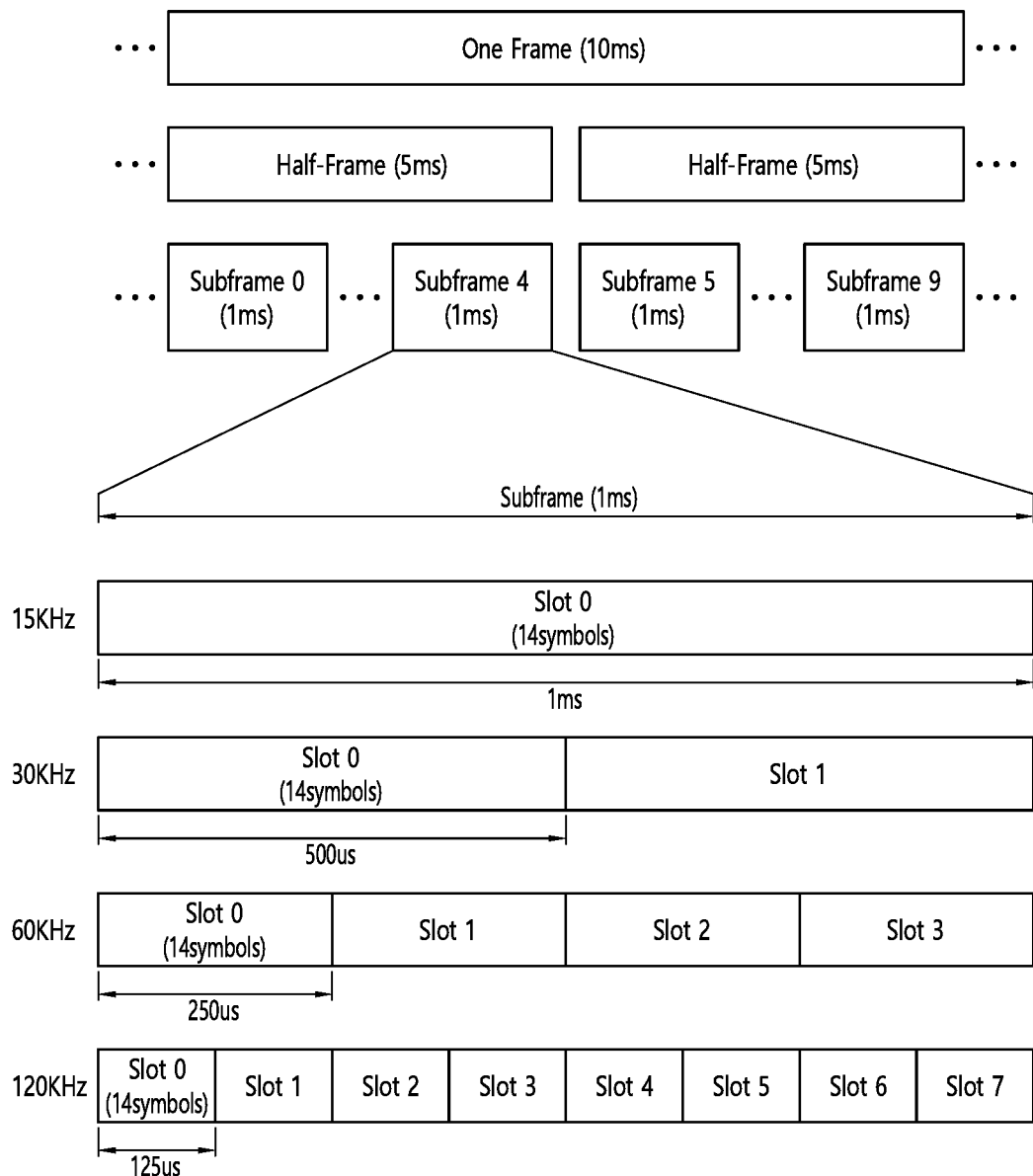
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TT) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2u*15$ kHz. The following table shows the number of OFDM symbols per slot, the number of slots per frame, and the number of slots per for the normal CP, according to the subcarrier spacing $\Delta f = 2u*15$ kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |

TABLE 3-continued

| u | Nslotsymb | Nframe, uslot | Nsubframe, uslot |
|---|---|---|---|
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing Δf=2u*15 kHz.

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of $N_{size,ugrid,x}$*$NRBsc$ subcarriers and $N_{subframe,usymb}$ OFDM symbols is defined, starting at common resource block (CRB) $N_{start,ugrid}$ indicated by higher-layer signaling (e.g. radio resource control (RRC) signaling), where $N_{size,ugrid,x}$ is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth $N_{size,ugrid}$ for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcariers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
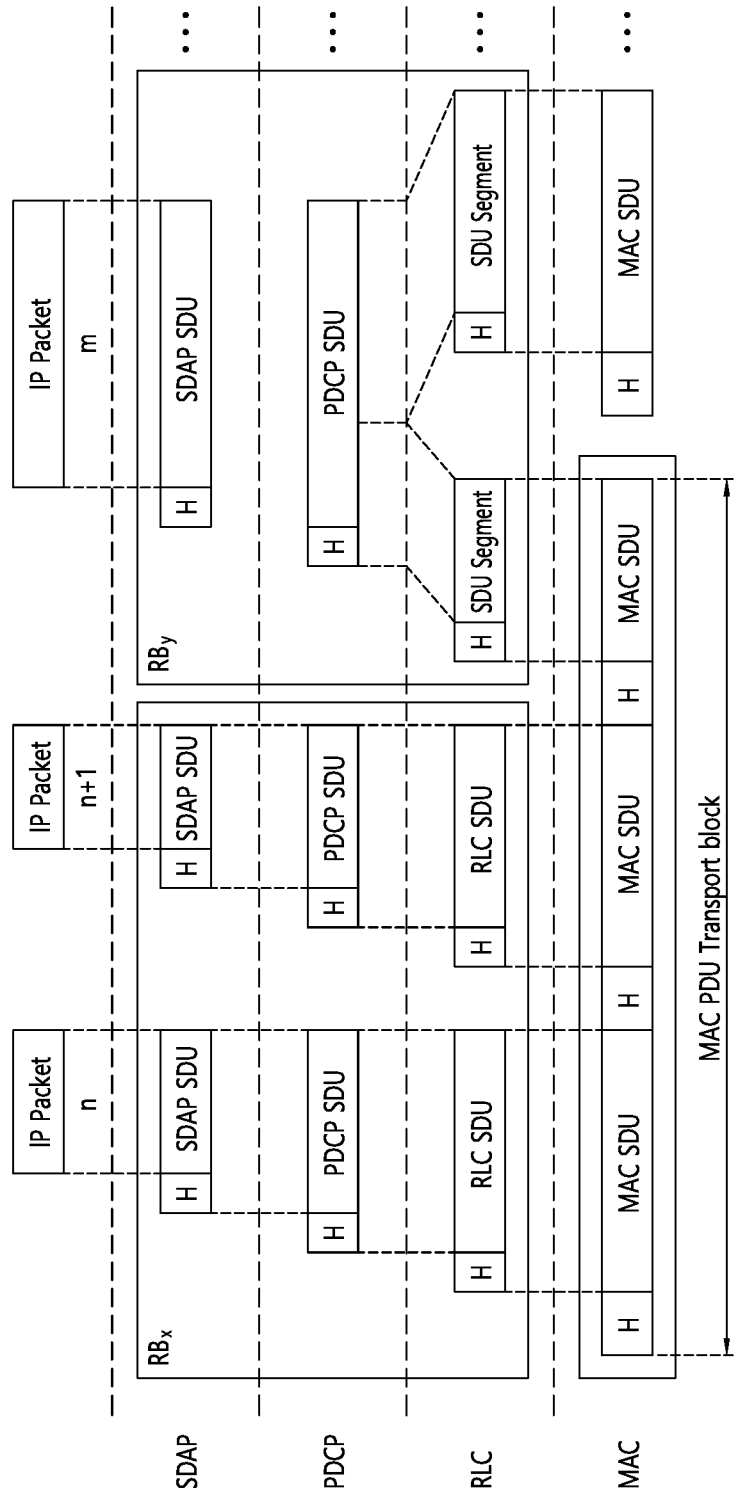
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
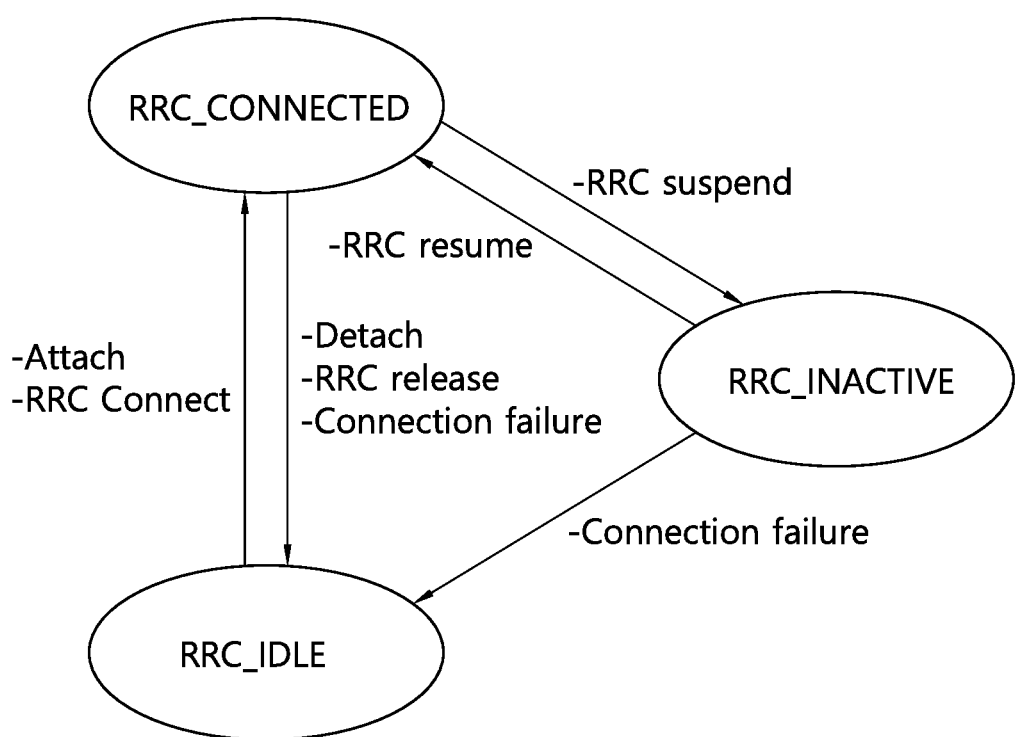
FIG. 9 shows an example of possible RRC states in a wireless communication system to which technical features of the present disclosure can be applied.

FIG. 9 shows an example of possible RRC states in a wireless communication system to which technical features of the present disclosure can be applied.

Referring to FIG. 9, there may be 3 possible RRC states in a wireless communication system (i.e., RRC_IDLE, RRC_CONNECTED and/or RRC_IDLE).

In RRC_IDLE (or, idle mode/state), RRC context for communication between a UE and a network may not be established in RAN, and the UE may not belong to a specific cell. Also, in RRC_IDLE, there is no core network connection for the UE. Since the device remains in sleep mode in most of the time to reduce battery consumption, data transfer between the UE and the network may not occur. UEs in RRC_IDLE may periodically wake-up to receive paging messages from the network. Mobility may be handled by the UE through cell reselection. Since uplink synchronization is not maintained, the UE may not perform uplink transmission other than transmissions for random access (e.g., random access preamble transmission) to move to RRC_CONNECTED.

In RRC_CONNECTED (or, connected state/mode), RRC context for communication between a UE and a network may be established in RAN. Also, in RRC_CONNECTED, core network connection is established for the UE. Since the UE belongs to a specific cell, cell-radio network temporary identifier (C-RNTI) for signalings between the UE and the network may be configured for the UE. Data transfer between the UE and the network may occur. Mobility may be handled by the network—that is, the UE may provide measurement report to the network, and the network may transmit mobility commands to the UE to perform a mobility. Uplink time alignment may need to be established based on a random access and maintained for data transmission.

In RRC_INACTIVE (or, inactive state/mode), RRC context for communication between a UE and a network may be kept in RAN. Data transfer between the UE and the network may not occur. Since core network connection may also be kept for the UE, the UE may fast transit to a connected state for data transfer. In the transition, core network signalling may not be needed. The RRC context may be already established in the network and idle-to-active transitions can be handled in the RAN. The UE may be allowed to sleep in a similar way as in RRC_IDLE, and mobility may be handled through cell reselection without involvement of the network. The RRC_INCATIVE may be construed as a mix of the idle state and the connected state.

As illustrated in FIG. 9, the UE may transit to RRC_CONNECTED from RRC_IDLE by performing initial attach procedure or RRC connection establishment procedure. The UE may transit to RRC_IDLE from RRC_CONNECTED when detach, RRC connection release and/or connection failure (e.g., radio link failure (RLF)) has occurred. The UE may transit to RRC_INACTIVE from RRC_INACTIVE when RRC connection is suspended, and transit to RRC_CONNECTED from RRC_INACTIVE when RRC connection is resume. The UE may transit to RRC_IDLE from RRC_INACTIVE when connection failure such as RLF has occurred.

Figure 10:
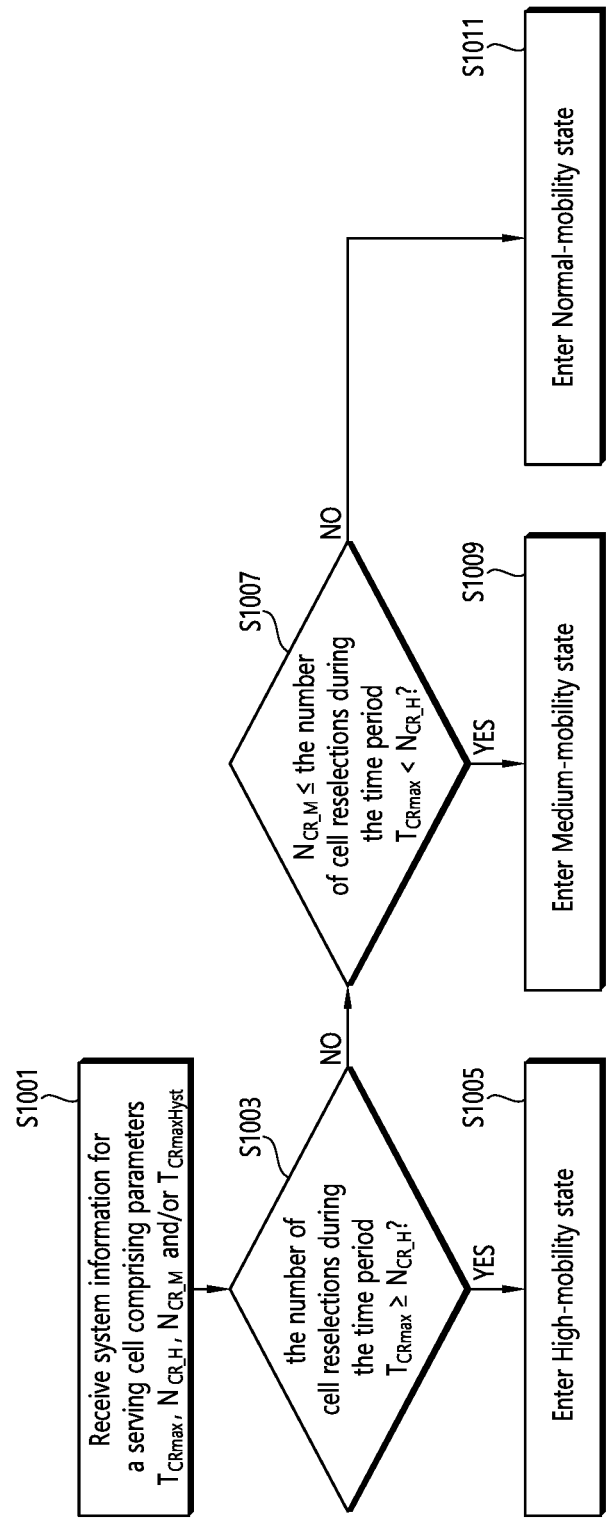
FIG. 10 shows an example of a method for mobility state estimation (MSE) to which technical features of the present disclosure can be applied.

FIG. 10 shows an example of a method for mobility state estimation (MSE) to which technical features of the present disclosure can be applied. Steps illustrated in FIG. 10 may be performed by a UE and/or a wireless device.

Referring to FIG. 10, in step S1001, the UE may receive system information for a serving cell comprising parameters $T_{CRmax}$, $N_{CR\_H}$, $N_{CR\_M}$ and/or $T_{CRmaxHyst}$. The UE's mobility state may be determined if the parameters $T_{CRmax}$, $N_{CR\_H}$, $N_{CR\_M}$ and/or $T_{CRmaxHyst}$ are broadcasted in the system information for the serving cell. $T_{CRmax}$ may specify the duration for evaluating allowed amount of cell reselection(s). $N_{CR\_M}$ may specify the maximum number of cell reselections to enter Medium-mobility state. $N_{CR\_H}$ may specify the maximum number of cell reselections to enter High-mobility state. $T_{CRmaxHyst}$ may specify the additional time period before the UE can enter Normal-mobility state.

In step S1003, the UE may determine whether the number of cell reselections during the time period $T_{CRmax}$ is greater than or equal to $N_{CR\_H}$. If the number of cell reselections during the time period $T_{CRmax}$ is greater than $N_{CR\_H}$, in step S1005, the UE may detect the criteria for High-mobility state, and enter High-mobility state. Otherwise, the UE may perform step S1007.

In step S1007, the UE may determine whether the number of cell reselections during the time period $T_{CRmax}$ is greater than or equal to $N_{CR\_M}$ but less than $N_{CR\_H}$. If the number of cell reselections during the time period $T_{CRmax}$ is greater than or equal to $N_{CR\_M}$ but less than $N_{CR\_H}$, in step S1009, the UE may detect the criteria for Medium-mobility state, and enter a Medium-mobility state. Otherwise, the UE may perform step S1011.

In step S1011, if the number of cell reselections during the time period $T_{CRmax}$ is less than $N_{CR\_M}$, the UE may detect the criteria for a normal-mobility state. Further, if the criteria for either Medium-mobility state or High-mobility state is not detected during the time period $T_{CRmaxHyst}$, the UE may enter a Normal-mobility state.

Hereinafter, cell reselection criteria is described. The cell reselection criteria may comprise intra-frequency cell reselection criteria and/or inter-frequency cell reselection criteria with equal priority.

For the cell reselection criteria, cell-ranking criterion R (or, simply R criterion/criteria) may be used. The ranking value that is determined according to the cell-ranking criterion R may be referred to as R value.

The cell-ranking criterion $R_s$ for serving cell may be defined by the equation $R_s = Q_{meas,s} + Q_{hyst} - Qoffset_{temp}$, and the cell-ranking criterion $R_n$ for neighboring cells may be defined by the $R_n = Q_{meas,n} - Qoffset - Qoffset_{temp}$. Parameters related to the above stated equations may be defined as Table 5 below:

TABLE 5

| | |
|---|---|
| $Q_{meas}$ | RSRP measurement quantity used in cell reselections. |
| Qoffset | For intra-frequency: Equals to $Qoffset_{s,\,n}$, if $Qoffset_{s,\,n}$ is valid, otherwise this equals to zero. For inter-frequency: Equals to $Qoffset_{s,\,n}$ plus $Qoffset_{frequency}$, if $Qoffset_{s,\,n}$ is valid, otherwise this equals to $Qoffset_{frequency}$. |
| $Qoffset_{temp}$ | Offset temporarily applied to a cell. |

The UE shall perform ranking of all cells that fulfil the cell selection criterion S. The cells shall be ranked according to the R criteria specified above by deriving $Q_{meas,n}$ and $Q_{meas,s}$, and calculating the R values using averaged RSRP results.

If rangeToBestCell is not configured, the UE shall perform cell reselection to the highest ranked cell. In contrast, if rangeToBestCell is configured, then the UE shall perform cell reselection to the cell with the highest number of beams above the threshold (i.e., absThreshSS-BlocksConsolidation) among the cells whose R value is within rangeToBestCell of the R value of the highest ranked cell. Throughout the disclosure, a beam above the threshold (i.e., a beam whose quality/beam quality/RSRP is above the threshold) may be referred to as 'good beam'. That is, if rangeToBestCell is configured, then the UE shall perform cell reselection to the cell with the highest number of good beams among the cells whose R value is within rangeToBestCell of the R value of the highest ranked cell. If there are multiple such cells, the UE shall perform cell reselection to the highest ranked cell among them.

In all cases, the UE shall reselect the new cell, only if i) the new cell is better than the serving cell according to the cell reselection criteria specified above during a time interval $Treselection_{RAT}$; and ii) more than 1 second has elapsed since the UE camped on the current serving cell. Herein, the $Treselection_{RAT}$ may specify the cell reselection timer value. For each target NR frequency and for each RAT other than NR, a specific value for the cell reselection timer may be defined, which is applicable when evaluating reselection within NR or towards other RAT (i.e., $Treselection_{RAT}$ for NR is $Treselection_{NR}$, for E-UTRAN $Treselection_{EUTRA}$).

Hereinafter, NR inter-frequency and inter-RAT cell reselection criteria is described.

If a threshold value "threshServingLowQ" is broadcast in system information and more than 1 second has elapsed since the UE camped on the current serving cell, cell reselection to a cell on a higher priority NR frequency or inter-RAT frequency than the serving frequency shall be performed if a cell of a higher priority NR or EUTRAN RAT/frequency fulfils $Squal>Thresh_{X,\,HighQ}$ during a time interval $Treselection_{RAT}$.

Otherwise, cell reselection to a cell on a higher priority NR frequency or inter-RAT frequency than the serving frequency shall be performed if:

A cell of a higher priority RAT/frequency fulfils $Srxlev>Thresh_{X,\,HighP}$ during a time interval $Treselection_{RAT}$; and More than 1 second has elapsed since the UE camped on the current serving cell.

Cell reselection to a cell on an equal priority NR frequency shall be based on ranking for intra-frequency cell reselection, as described above.

If threshServingLowQ is broadcast in system information and more than 1 second has elapsed since the UE camped on the current serving cell, cell reselection to a cell on a lower priority NR frequency or inter-RAT frequency than the serving frequency shall be performed if the serving cell fulfils $Squal<Thresh_{Serving,\,LowQ}$ and a cell of a lower priority NR or E-UTRAN RAT/frequency fulfils $Squal>Thresh_{X,\,LowQ}$ during a time interval $Treselection_{RAT}$.

Otherwise, cell reselection to a cell on a lower priority NR frequency or inter-RAT frequency than the serving frequency shall be performed if:

The serving cell fulfils $Srxlev<Thresh_{Serving,\,LowP}$ and a cell of a lower priority RAT/frequency fulfils $Srxlev>Thresh_{X,\,LowP}$ during a time interval $Treselection_{RAT}$; and More than 1 second has elapsed since the UE camped on the current serving cell.

Cell reselection to a higher priority RAT/frequency shall take precedence over a lower priority RAT/frequency if multiple cells of different priorities fulfil the cell reselection criteria.

If more than one cell meets the above criteria, the UE shall reselect a cell as follows:

If the highest-priority frequency is an NR frequency, the UE shall reselect the highest ranked cell among the cells on the highest priority frequency(ies) meeting the criteria.

If the highest-priority frequency is from another RAT, the UE shall reselect the highest ranked cell among the cells on the highest priority frequency(ies) meeting the criteria of that RAT.

Hereinafter, procedure when a UE receives an RRC connection release message (i.e., RRCConnectionRelease message) is described.

When the UE received an RRC connection release message, the UE shall:

1> if the RRCConnectionRelease message includes the measIdleConfig:

2> clear VarMeasIdleConfig and VarMeasIdleReport;

2> store the received measIdleDuration in VarMeasIdleConfig;

2> start T331 with the value of measIdleDuration;

2> if the measIdleConfig contains measIdleCarrierListEUTRA:

3> store the received measIdleCarrierListEUTRA in VarMeasIdleConfig;

3> start performing idle mode measurements.

The information element (IE) measIdleConfig in the RRCConnectionRelease message may be used to convey information to UE about measurement requested to be done while in RRC_IDLE or RRC_INACTIVE. Contents of the measIdleConfig are described in table 6:

```
-- ASN1START
MeasIdleConfigSIB-r15 ::= SEQUENCE {
measIdleCarrierListEUTRA-r15   EUTRA-CarrierList-r15,
...
}
```

```
MeasIdleConfigDedicated-r15 ::= SEQUENCE {
measIdleCarrierListEUTRA-r15  EUTRA-CarrierList-r15
OPTIONAL,         -- Need OR
measIdleDuration-r15              ENUMERATED {sec10, sec30, sec60, sec120,
sec180, sec240, sec300, spare},
...
}
    EUTRA-CarrierList-r15 ::= SEQUENCE (SIZE (1..maxFreqIdle-r15)) OF
MeasIdleCarrierEUTRA-r15
    MeasIdleCarrierEUTRA-r15::=       SEQUENCE {
    carrierFreq-r15                        ARFCN-ValueEUTRA-
r9,
    allowedMeasBandwidth-r15            AllowedMeasBandwidth,
    validityArea-r15                    CellList-r15
        OPTIONAL,         -- Need OR
    measCellList-r15                        CellList-r15
                OPTIONAL,    -- Need OR
    reportQuantities                        ENUMERATED {rsrp, rsrq,
both},
    qualityThreshold-r15                SEQUENCE {
        idleRSRP-Threshold-r15              RSRP-Range
                OPTIONAL,     -- Need OR
        idleRSRQ-Threshold-r15                          RSRQ-Range-
r13                    OPTIONAL     -- Need OR
    }
                                OPTIONAL,    -- Need OP
...
}
    CellList-r15 ::=       SEQUENCE (SIZE (1.. maxCellMeasIdle-r15)) OF
PhysCellIdRange
    -- ASN1STOP
```

The field carrierFreq may indicate the E-UTRA carrier frequency to be used for measurements during RRC_IDLE or RRC_INACTIVE mode. The field measIdleCarrierListEUTRA may indicate the E-UTRA carriers to be measured during RRC_IDLE or RRC_INACTIVE mode. The field measIdleDuration may indicate the duration for performing measurements during RRC_IDLE or RRC_INACTIVE mode for measurements assigned via RRCConnectionRelease. The field measCellList may indicate the list of cells which the UE is requested to measure and report for IDLE mode measurements. The field validityArea may indicate the list of cells within which UE is requested to do IDLE mode measurements. If the UE reselects to a cell whose physical cell identity does not match any entry in validityArea for the corresponding carrier frequency, the measurements may be no longer required.

That is, the measIdleConfig may be a configuration for a measurement while UE is in RRC_IDLE or RRC_INACTIVE. Thus, the measIdleConfig may be referred to as early measurement configuration, idle measurement configuration, and/or idle mode measurement configuration.

Further, UE may start the T331 timer upon receiving RRCConnectionRelease message including measIdleConfig. The UE may stop the T331 timer upon receiving RRCConnectionSetup message, RRCConnectionResume message, or, if validityArea is configured, upon reselecting to a cell that does not belong to validityArea. When the UE receives RRCConnectionSetup message, the UE may enter RRC_CONNECTED from RRC_IDLE. When the UE receives RRCConnectionResume message, the UE may enter RRC_CONNECTED from RRC_INACTIVE. When the T331 timer expires, the UE may release the stored VarMeasIdleConfig or release the stored idle measurement configuration.

Hereinafter, idle mode measurement procedure is described.

The idle mode measurement procedure specifies the measurements done by a UE in RRC_IDLE or RRC_INACTIVE when the UE has an IDLE mode measurement configuration (e.g., measIdleConfig) and the storage of the available measurements performed by a UE in RRC_IDLE, RRC_INACTIVE and RRC_CONNECTED.

While the T331 timer is running the UE shall:

1> perform the measurements in accordance with the following:

2> for each entry in measIdleCarrierListEUTRA within VarMeasIdleConfig:

3> if UE supports carrier aggregation between serving carrier and the carrier frequency and bandwidth indicated by carrierFreq and allowedMeasBandwidth within the corresponding entry;

4> perform measurements in the carrier frequency and bandwidth indicated by carrierFreq and allowedMeasBandwidth within the corresponding entry;

4> if the measCellList is included:

5> consider the serving cell and cells identified by each entry within the measCellList to be applicable for idle mode measurement reporting;

4> else:

5> consider the serving cell and up to maxCellMeasIdle strongest identified cells whose RSRP/RSRQ measurement results are above the value(s) provided in qualityThreshold (if any) to be applicable for idle mode measurement reporting;

4> store measurement results for cells applicable for idle mode measurement reporting within the VarMeasIdleReport;

3> else:

4> do not consider the carrier frequency to be applicable for idle mode measurement reporting;

1> if validityArea is configured in VarMeasIdleConfig and UE reselects to a serving cell whose physical cell identity does not match any entry in validityArea for the corresponding carrier frequency:

2> stop T331;

If the T331 timer expires or is stopped, the UE may release the VarMeasIdleConfig. That is, the UE may release the idle measurement configuration.

As described above, idle measurement configuration may be received via RRCConnectionRelease message (i.e., the UE may receive RRCConnectionRelease message comprising the idle measurement configuration). For example, the idle measurement configuration included in RRCConnectionRelease message which is a dedicated message may be referred to as measIdleConfigDedicated. The idle measurement configuration may also be received via system information block type 5 (SIB5) (i.e., the UE may receive SIB5 comprising the idle measurement configuration). For example, the idle measurement configuration included in SIB5 may be referred to as measeIdleConfigSIB.

Upon receiving the SIB5 comprising measIdleConfigSIB, the UE shall:

1> if in RRC_IDLE and UE has stored VarMeasIdleConfig and the UE is capable of IDLE mode measurements for CA:

2> if T331 is running and VarMeasIdleConfig does not contain measIdleCarrierListEUTRA received from the RRCConnectionRelease message:

3> store or replace the measIdleCarrierListEUTRA of measIdleConfigSIB within VarMeasIdleConfig;

2> perform idle mode measurements.

In a wireless communication system, MeasIdleConfig can be provided via dedicated signalling (i.e., RRCConnectionRelease) or broadcast system information (e.g., SIB5). When a UE receives RRCConnectionRelease message including the measIdleConfig which includes a timer value (e.g., measIdleDuration) and frequency list (e.g., measIdleCarrierListEUTRA), the UE may store the received information and start a timer (e.g., T331 timer) with the measIdleDuration. While the timer is running, the UE may perform idle mode measurement on the frequencies in the frequency list, ignoring the frequency list provided via broadcast system information. When the timer expires, the UE may delete the stored information and acquire the MeasIdleConfig in the broadcast system information, if configured.

However, after receiving the MeasIdleConfig via dedicated signalling, when the UE performs cell reselection while in idle/inactive state, the UE may still ignore related information included in the MeasIdleConfig received via system information until the timer expires. After receiving the MeasIdleConfig via dedicated signalling, if the UE starts to move fast, the UE may perform cell reselection repeatedly. After times of cell reselection, even though the provided dedicated configuration (e.g., measIdleConfig received via dedicated signalling such as RRCConnectionRelease message) may not be suitable for the new serving cell, the UE may perform unnecessary idle mode measurement based on the dedicated configuration.

Therefore, various embodiments of the present disclosure provide method and apparatus for scaling the length of timer value (e.g., length of T331 timer) based on a mobility state of the wireless device after receiving the dedicated configuration (e.g., measIdleConfig received via dedicated signaling such as RRCConnectionRelease message) so that the timer can expire earlier and the UE can receive new configuration (e.g., cell-specific/common measurement configuration) via broadcast system information from the new serving cell.

Figure 11:
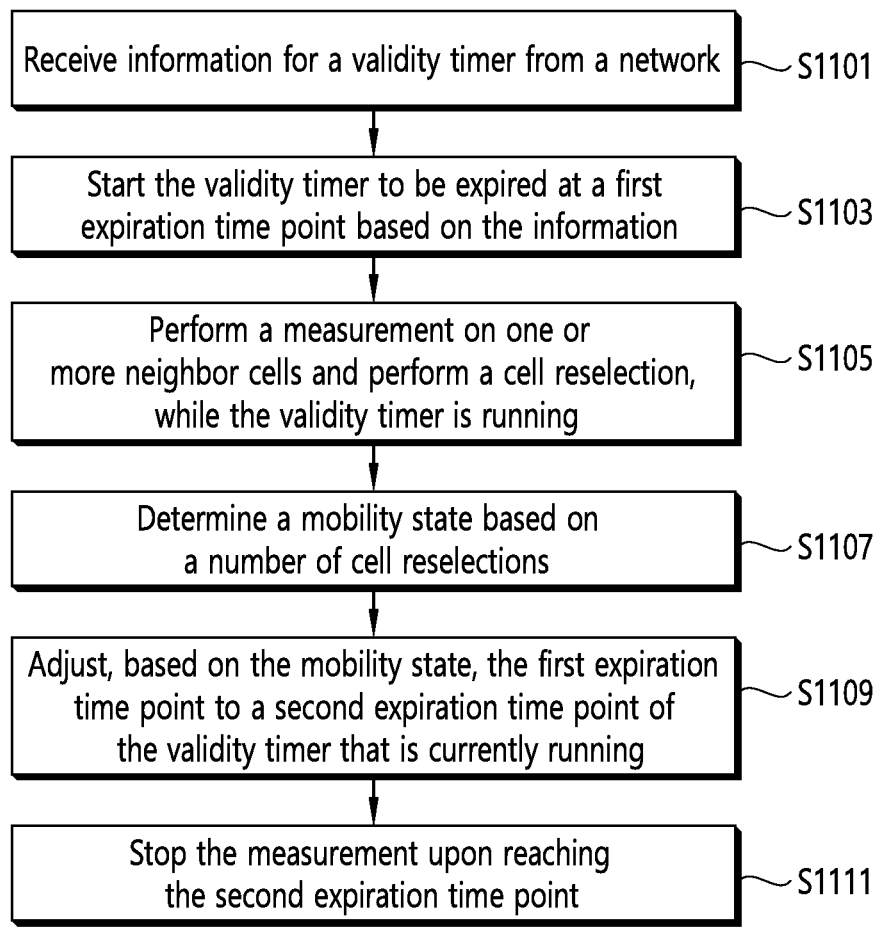
FIG. 11 shows an example of a method for adjusting a validity timer according to an embodiment of the present disclosure.

FIG. 11 shows an example of a method for adjusting a validity timer according to an embodiment of the present disclosure. Steps illustrated in FIG. 11 may be performed by a wireless device and/or a UE.

Referring to FIG. 11, in step S1101, the wireless device may receive information for a validity timer from a network. For example, the wireless device may receive a dedicated measurement configuration (e.g., MeasIdleConfigDedicated) comprising the information for the validity timer via a dedicated signalling. The dedicated signalling may comprise RRC connection release message. The wireless device may store the dedicated measurement configuration.

In step S1103, the wireless device may start the validity timer to be expired at a first expiration time point based on the information. The information for the validity time may comprise a first running duration of the validity timer (e.g., measIdleDuration). The first expiration time point may be a time point immediately after the first time duration has elapsed from when the validity timer is started.

In step S1105, the wireless device may perform a measurement on one or more neighbour cells and perform a cell reselection, while the validity timer is running. The cell reselection may be performed according to cell reselection criteria as described above.

In step S1107, the wireless device may determine/enter a mobility state based on a number of cell reselections. The wireless device may determine a mobility state according to MSE as described in FIG. 10.

In step S1109, the wireless device may adjust, based on the mobility state, the first expiration time point to a second expiration time point of the validity timer that is currently running. That is, the wireless device may adjust an expiration time point of the validity timer that is currently running from the first expiration time point to the second expiration time point based on the mobility state. The second expiration time point may be prior to the first expiration time point.

In step S1111, the wireless device may stop the measurement upon reaching the second expiration time point. Further, after reaching the second expiration time point, the wireless device may delete the stored dedicated measurement configuration. The wireless device may receive, from a serving cell to which the cell reselection is performed, a common measurement configuration (e.g., measIdleConfigSIB) comprising a frequency list (e.g., measIdleCarrierListEUTRA) via a broadcast signalling (e.g., SIB5). The wireless device may perform a measurement on at least one frequency in the frequency list included in the common measurement configuration.

According to various embodiments, the dedicated measurement configuration may further comprise at least one of a frequency list (e.g., measIdleCarrierListEUTRA) and a scaling factor. The measurement may be performed on at least one frequency included in the frequency list.

According to various embodiments, the mobility state may comprise at least one of a normal mobility state, a medium mobility state, or a high mobility state. The at least one scaling factor may comprise a first scaling factor for the normal mobility state, a second scaling factor for the medium mobility state, and a third scaling factor for the high mobility state. The third scaling factor may be smaller than the second scaling factor, and the second scaling factor may be smaller than the first scaling factor. At least the third scaling factor and the second scaling factor may be less than 1. The first scaling factor may be less than 1, equal to 1, or higher than 1.

According to various embodiments, the wireless device may multiply the first running duration by a scaling factor for the mobility state to obtain a second running duration of the validity timer. There may be a case that the second running duration is longer than an elapsed time duration from when the validity timer is started to a time point the mobility state is determined (i.e., to the current time). In this case, for example, the second expiration time point may be determined as a time point immediately after the second time duration has elapsed from when the timer is started. The wireless device may stop the measurement when the validity timer expires at the second expiration time point. For another example, the wireless device may identify a remaining time duration which equals to the second time duration minus the elapsed time duration. Upon determining the mobility state, the wireless device may stop the validity timer and starting another validity timer having the remaining time duration. The second time point may be determined as a time point immediately after the remaining time duration has elapsed from when the mobility state is determined. The wireless device may stop the measurement when the validity timer expires at the second expiration time point.

According to various embodiments, there may be another cast that the second running duration is shorter than an elapsed time duration from when the validity timer is started to a time point the mobility state is determined (i.e., to the current time). In this case, the second expiration time point is determined as the time point the mobility state is determined. The wireless device may stop the measurement when the validity timer immediately expires at the second expiration time point.

According to various embodiments, the wireless device may identify a remaining time duration from when the mobility state is determined to the first expiration time point. The wireless device may multiply the remaining time duration by the scaling factor to obtain a scaling factor for the mobility state to obtain a second running duration of the validity timer. For example, the second expiration time point may be determined as a time point after the second time duration has elapsed from when the mobility state is determined. The wireless device may stop the measurement when the validity timer expires at the second expiration time point. For another example, upon determining the mobility state, the wireless device may stop the validity timer and start another validity timer having the second. The second expiration time point may be determined as a time point after the second time duration has elapsed from when the mobility state is determined. The wireless device may stop the measurement when the another validity timer expires at the second expiration time point.

According to various embodiments, the wireless device may start the validity timer upon receiving the information for the validity timer/upon receiving the dedicated measurement configuration via dedicated signalling.

According to various embodiments, the wireless device may receive information block including timer value and a scaling factor for the timer value. The wireless device may start a timer. While the timer is running, the wireless device may perform measurement according to the information block. When the wireless device enters high-mobility state, multiply the length of the timer by the scaling factor.

Figure 12:
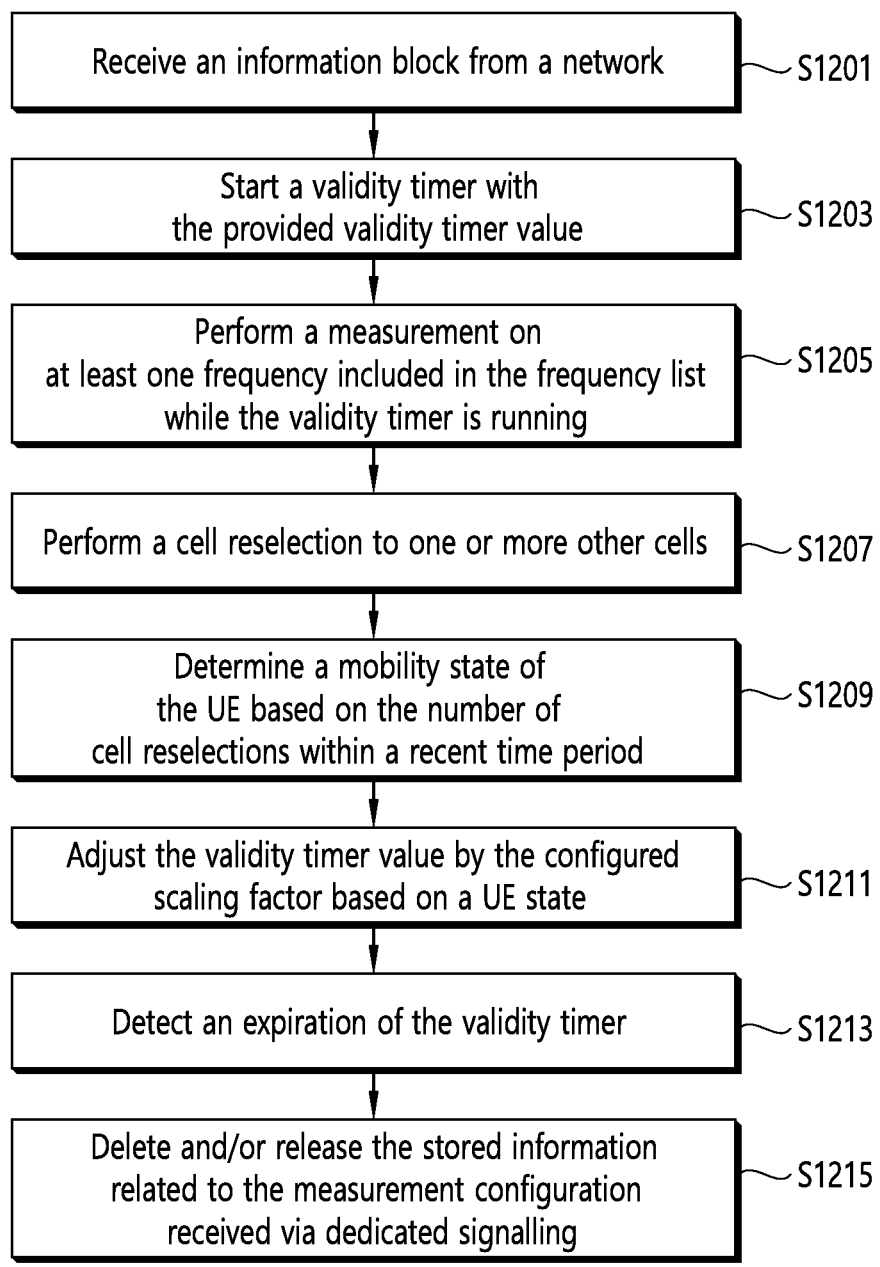
FIG. 12 shows an example of a method for validity timer scaling according to an embodiment of the present disclosure.

FIG. 12 shows an example of a method for validity timer scaling according to an embodiment of the present disclosure. Steps illustrated in FIG. 12 may be performed by a wireless device and/or a UE.

Referring to FIG. 12, in step S1201, the UE may receive an information block from a network. For example, the information block may be an RRCConnectionRelease message and provided via dedicated signalling. The information block may include at least one of a measurement configuration (e.g., MeasIdleConfigDedicated) including validity timer value (e.g., T331 timer value, which may be measIdleDuration), frequency list (e.g., measIdleCarrierListEUTRA) or scaling factor. The UE may store information related to the measurement configuration and/or may store the measurement configuration.

In step S1203, the UE may start a validity timer (e.g., T331 timer) with the provided validity timer value received in step S1201. After starting the validity timer, when the timer value elapsed, the validity timer may expire. When the validity timer expires, the UE may delete the received information block.

In step S1205, the UE may perform a measurement on at least one frequency included in the frequency list while the validity timer is running.

In step S1207, the UE may perform a cell reselection to one or more other cells. For example, the UE may perform a cell reselection to one or more other cells based on a cell reselection criteria described above.

In step S1209, the UE may determine a mobility state of the UE based on the number of cell reselections within a recent time period (e.g., $T_{CRmax}$), as specified in 3GPP TS 38.304. The mobility state may comprise at least one of a normal-mobility state, a medium-mobility state, or a high-mobility state.

In step S1211, the UE may adjust the validity timer value by the configured scaling factor received in step S1201, based on a UE state. The UE state may comprise the mobility state determined in step S1209, or serving cell quality. The scaling factor may be configured for each mobility state. The scaling factor may be configured for serving/neighbour cell quality range.

To adjust the validity timer value, at least one of the following ① or ② may be performed:

① The validity timer value received in step S1201 may be multiplied by the scaling factor.

If the multiplied validity timer value is longer than the elapsed time from when the validity timer has been started to the current time, i) the currently running validity timer may run until reaching the multiplied validity timer value, or ii) currently running validity timer may be stopped and a new validity timer may be started with remaining time, which may be [multiplied timer value—the elapsed time from when the validity timer has been started to the current time].

On the other hand, if the multiplied validity timer value is shorter than the elapsed time from when the validity timer has been started to the current time, the currently running validity timer may expire immediately.

② The remaining time of the validity timer may be multiplied by the scaling factor. The remaining time of the timer may be [the validity timer value received in the step S1201—the elapsed time from when the validity timer has been started to the current time]. For example, the currently running validity timer may run until reaching the multiplied time value. For another example, currently running validity timer may be stopped and a new validity timer may be started with the multiplied time value.

In step S1213, the UE may detect an expiration of the validity timer. The validity timer with the adjusted validity timer value may expire earlier than that with the originally configured validity timer value.

In step S1215, after the validity timer expires, the UE may delete/release the stored information related to the measurement configuration received via dedicated signalling. Then, the UE may receive an information block from a network (e.g., from a reselected new serving cell) via broadcast signalling. For example, the information block may be SIB5.

The information block may include a measurement configuration (e.g., measdIdleConfigSIB) including a frequency list (e.g., measIdleCarrierListEUTRA). The UE may perform measurement on at least one frequency included in the frequency list.

Suppose that the validity timer value is given 10 seconds and scaling factor is given 0.5 for medium-mobility state. Upon/after receiving the information block including the validity timer value (i.e., 10 seconds), the UE may start the validity timer with the validity timer value 10 seconds.

For example, the UE may enter a medium-mobility state after 3 seconds from when the validity timer has been started. The validity timer value (i.e., 10 seconds) may be multiplied by the scaling factor (i.e., 0.5). Therefore, the multiplied validity timer value may be 5 seconds.

Figure 13:
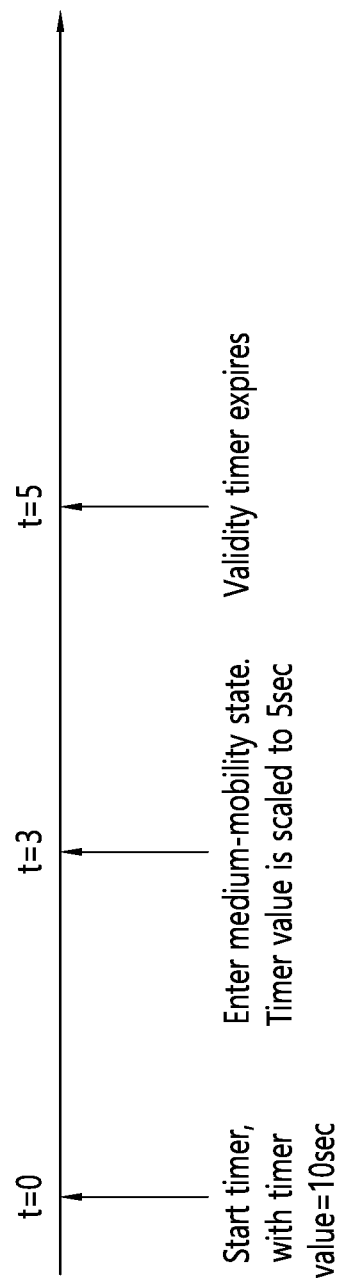
FIGS. 13 to 17 show example graphs to illustrate validity timer scaling according to an embodiment of the present disclosure.

As illustrated in FIG. 13, if the multiplied validity timer value (i.e., 5 seconds) is longer than the elapsed time from when the validity timer has been started (i.e., 3 seconds), the currently running validity timer may run until reaching the multiplied validity timer value (i.e., 5 seconds).

Figure 14:
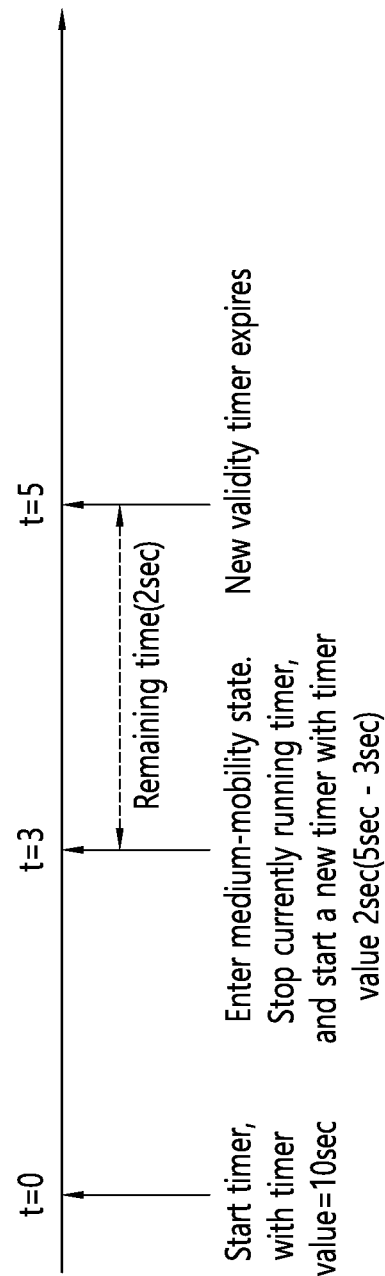

As illustrated in FIG. 14, if the multiplied validity timer value (i.e., 5 seconds) is longer than the elapsed time from when the validity timer has been started, the currently running validity timer may be stopped and a new validity timer with the remaining time (i.e., 2 seconds, which is equal to the multiplied timer value (i.e., 5 seconds) minus the elapsed time from when the validity timer has been started (i.e., 3 seconds)) may be started.

For another example, the UE may enter a medium-mobility state after 7 seconds from when the validity timer has been started. The validity timer value (i.e., 10 seconds) may be multiplied by the scaling factor (i.e., 0.5). Therefore, the multiplied validity timer value may be 5 seconds.

Figure 15:
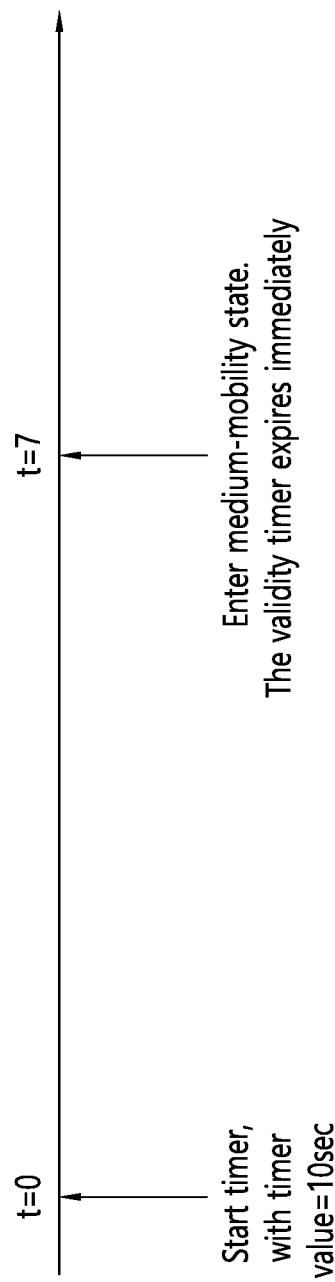

As illustrated in FIG. 15, if the multiplied validity timer value (i.e., 5 seconds) is shorter than the elapsed time from when the validity timer has been started (i.e., 7 seconds), the currently running validity timer may expire immediately.

For another example, the UE may enter a medium-mobility state after 3 seconds from when the validity timer has been started. In this case, the remaining time of the validity timer (i.e., 7 seconds, which is equal to the timer value (i.e., 10 seconds) minus the elapsed time from when the validity timer has been started (i.e., 3 seconds)) may be multiplied by the scaling factor (i.e., 0.5). Therefore, the multiplied remaining time may be equal to 3.5 seconds.

Figure 16:
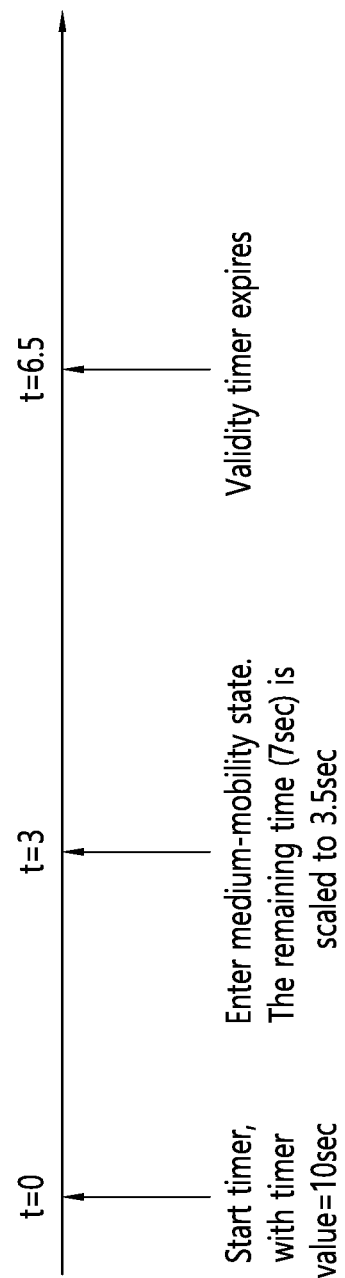

As illustrated in FIG. 16, the currently running validity timer may run until reaching the multiplied remaining time of the validity timer.

Figure 17:
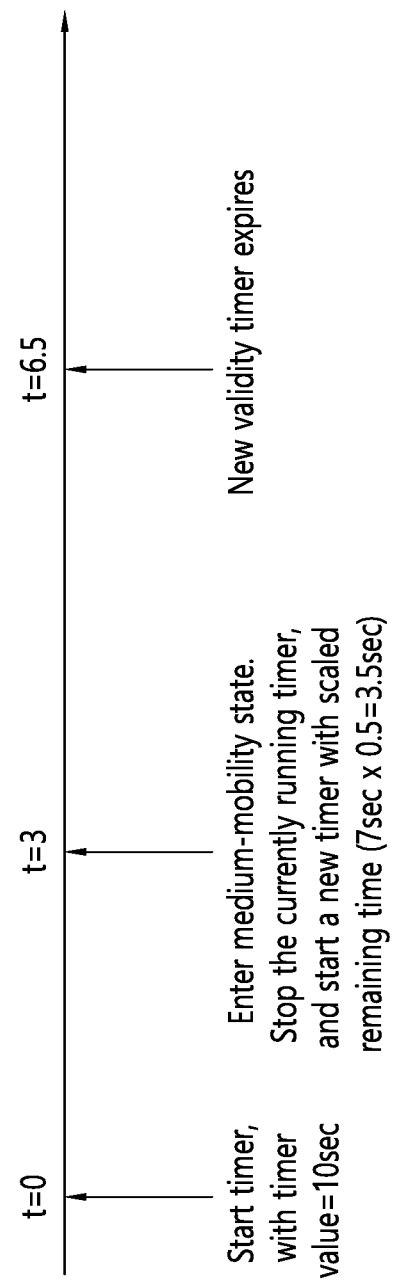

As illustrated in FIG. 17, the currently running validity timer may be stopped and a new validity timer with the multiplied remaining time (i.e., 3.5 seconds) may be started.

Figure 18:
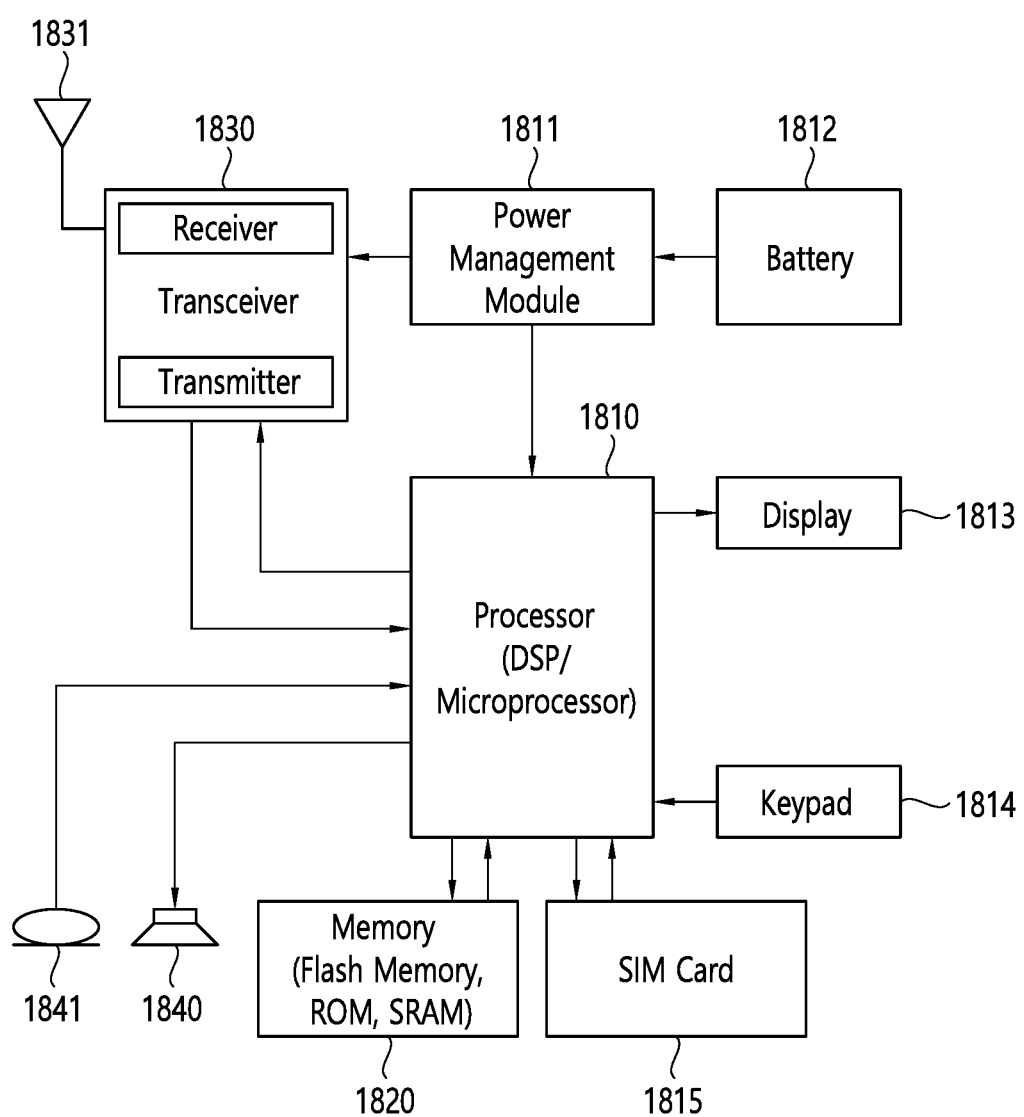
FIG. 18 shows a UE to implement an embodiment of the present disclosure. The present disclosure described above for UE side may be applied to this embodiment.

FIG. 18 shows a UE to implement an embodiment of the present disclosure. The present disclosure described above for UE side may be applied to this embodiment.

A UE includes a processor 1810, a power management module 1811, a battery 1812, a display 1813, a keypad 1814, a subscriber identification module (SIM) card 1815, a memory 1820, a transceiver 1830, one or more antennas 1831, a speaker 1840, and a microphone 1841.

The processor 1810 may be configured to implement proposed functions, procedures and/or methods described in this description. Layers of the radio interface protocol may be implemented in the processor 1810. The processor 1810 may include application-specific integrated circuit (ASIC), other chipset, logic circuit and/or data processing device. The processor 1810 may be an application processor (AP). The processor 1810 may include at least one of a digital signal processor (DSP), a central processing unit (CPU), a graphics processing unit (GPU), a modem (modulator and demodulator). An example of the processor 1810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1810 may be configured to, or configured to control the transceiver 1830 to implement steps performed by the UE and/or the wireless device throughout the disclosure.

The power management module 1811 manages power for the processor 1810 and/or the transceiver 1830. The battery 1812 supplies power to the power management module 1811. The display 1813 outputs results processed by the processor 1810. The keypad 1814 receives inputs to be used by the processor 1810. The keypad 1814 may be shown on the display 1813. The SIM card 1815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1820 is operatively coupled with the processor 1810 and stores a variety of information to operate the processor 1810. The memory 1820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1820 and executed by the processor 1810. The memory 1820 can be implemented within the processor 1810 or external to the processor 1810 in which case those can be communicatively coupled to the processor 1810 via various means as is known in the art.

The transceiver 1830 is operatively coupled with the processor 1810, and transmits and/or receives a radio signal. The transceiver 1830 includes a transmitter and a receiver. The transceiver 1830 may include baseband circuitry to process radio frequency signals. The transceiver 1830 controls the one or more antennas 1831 to transmit and/or receive a radio signal.

The speaker 1840 outputs sound-related results processed by the processor 1810. The microphone 1841 receives sound-related inputs to be used by the processor 1810.

Figure 19:
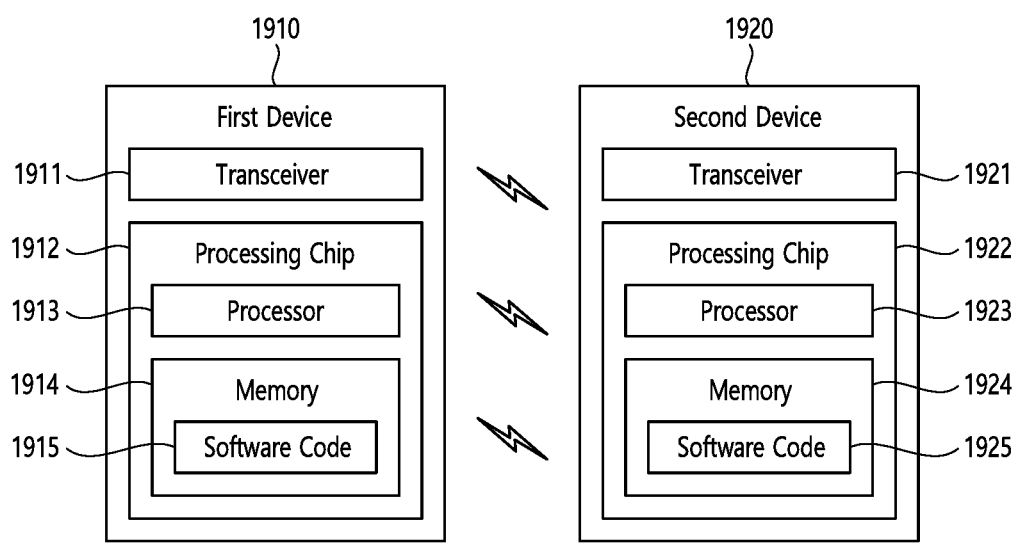
FIG. 19 shows another example of a wireless communication system to which the technical features of the present disclosure can be applied.

FIG. 19 shows another example of a wireless communication system to which the technical features of the present disclosure can be applied.

Referring to FIG. 19, the wireless communication system may include a first device 1910 (i.e., first device 210) and a second device 1920 (i.e., second device 220).

The first device 1910 may include at least one transceiver, such as a transceiver 1911, and at least one processing chip, such as a processing chip 1912. The processing chip 1912 may include at least one processor, such a processor 1913, and at least one memory, such as a memory 1914. The memory may be operably connectable to the processor 1913. The memory 1914 may store various types of information and/or instructions. The memory 1914 may store a software code 1915 which implements instructions that, when executed by the processor 1913, perform operations of the first device 910 described throughout the disclosure. For example, the software code 1915 may implement instructions that, when executed by the processor 1913, perform the functions, procedures, and/or methods of the first device 1910 described throughout the disclosure. For example, the software code 1915 may control the processor 1913 to perform one or more protocols. For example, the software code 1915 may control the processor 1913 to perform one or more layers of the radio interface protocol.

The second device 1920 may include at least one transceiver, such as a transceiver 1921, and at least one processing chip, such as a processing chip 1922. The processing chip 1922 may include at least one processor, such a processor 1923, and at least one memory, such as a memory 1924. The memory may be operably connectable to the processor 1923. The memory 1924 may store various types of information and/or instructions. The memory 1924 may store a software code 1925 which implements instructions that, when executed by the processor 1923, perform operations of the second device 1920 described throughout the disclosure. For example, the software code 1925 may implement instructions that, when executed by the processor 1923, perform the functions, procedures, and/or methods of the second device 1920 described throughout the disclosure. For example, the software code 1925 may control the processor 1923 to perform one or more protocols. For example, the software code 1925 may control the processor 1923 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 20:
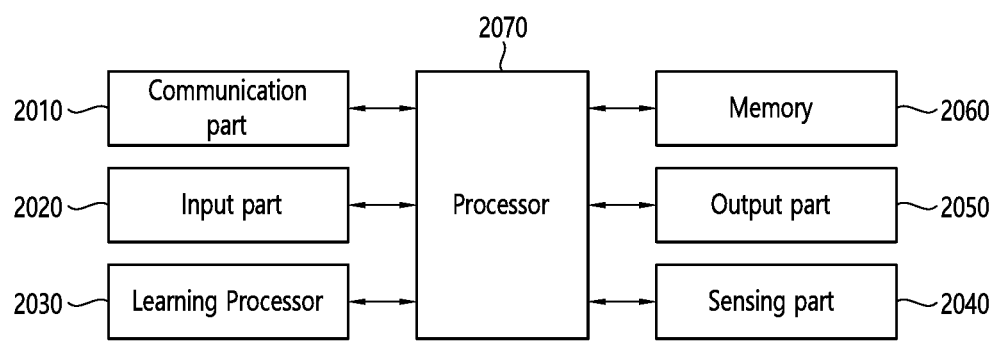
FIG. 20 shows an example of an AI device to which the technical features of the present disclosure can be applied.

FIG. 20 shows an example of an AI device to which the technical features of the present disclosure can be applied.

The AI device 2000 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 20, the AI device 2000 may include a communication part 2010, an input part 2020, a learning processor 2030, a sensing part 2040, an output part 2050, a memory 2060, and a processor 2070.

The communication part 2010 can transmit and/or receive data to and/or from external devices such as the AI devices and the AI server using wire and/or wireless communication technology. For example, the communication part 2010 can transmit and/or receive sensor information, a user input, a learning model, and a control signal with external devices. The communication technology used by the communication part 2010 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 2020 can acquire various kinds of data. The input part 2020 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 2020 can acquire input data to be used when acquiring an output using learning data and a learning model for model learning. The input part 2020 may obtain raw input data, in which case the processor 2070 or the learning processor 2030 may extract input features by preprocessing the input data.

The learning processor 2030 may learn a model composed of an ANN using learning data. The learned ANN can be referred to as a learning model. The learning model can be used to infer result values for new input data rather than learning data, and the inferred values can be used as a basis for determining which actions to perform. The learning processor 2030 may perform AI processing together with the learning processor of the AI server. The learning processor 2030 may include a memory integrated and/or implemented in the AI device 2000. Alternatively, the learning processor 2030 may be implemented using the memory 2060, an external memory directly coupled to the AI device 2000, and/or a memory maintained in an external device.

The sensing part 2040 may acquire at least one of internal information of the AI device 2000, environment information of the AI device 2000, and/or the user information using various sensors. The sensors included in the sensing part 2040 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 2050 may generate an output related to visual, auditory, tactile, etc. The output part 2050 may include a display unit for outputting visual information, a speaker for outputting auditory information, and/or a haptic module for outputting tactile information.

The memory 2060 may store data that supports various functions of the AI device 2000. For example, the memory 2060 may store input data acquired by the input part 2020, learning data, a learning model, a learning history, etc.

The processor 2070 may determine at least one executable operation of the AI device 2000 based on information determined and/or generated using a data analysis algorithm and/or a machine learning algorithm. The processor 2070 may then control the components of the AI device 2000 to perform the determined operation. The processor 2070 may request, retrieve, receive, and/or utilize data in the learning processor 2030 and/or the memory 2060, and may control the components of the AI device 2000 to execute the predicted operation and/or the operation determined to be desirable among the at least one executable operation. The processor 2070 may generate a control signal for controlling the external device, and may transmit the generated control signal to the external device, when the external device needs to be linked to perform the determined operation. The processor 2070 may obtain the intention information for the user input and determine the user's requirements based on the obtained intention information. The processor 2070 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 2030 and/or learned by the learning processor of the AI server, and/or learned by their distributed processing. The processor 2070 may collect history information including the operation contents of the AI device 2000 and/or the user's feedback on the operation, etc. The processor 2070 may store the collected history information in the memory 2060 and/or the learning processor 2030, and/or transmit to an external device such as the AI server. The collected history information can be used to update the learning model. The processor 2070 may control at least some of the components of AI device 2000 to drive an application program stored in memory 2060. Furthermore, the processor 2070 may operate two or more of the components included in the AI device 2000 in combination with each other for driving the application program.

Figure 21:
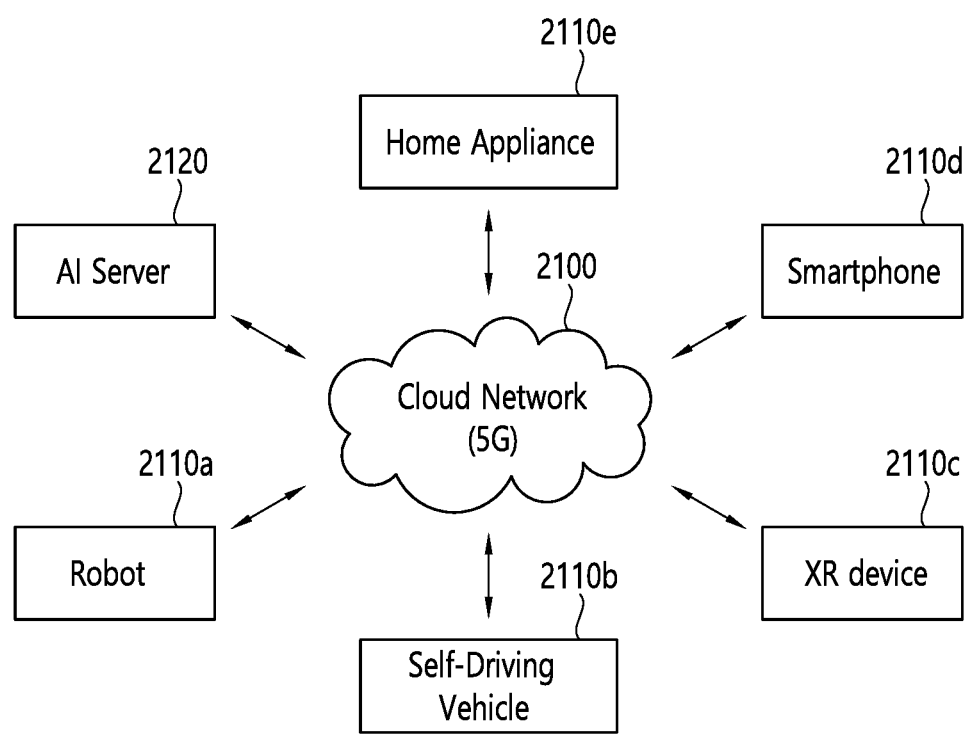
FIG. 21 shows an example of an AI system to which the technical features of the present disclosure can be applied.

FIG. 21 shows an example of an AI system to which the technical features of the present disclosure can be applied.

Referring to FIG. 21, in the AI system, at least one of an AI server 2120, a robot 2110a, an autonomous vehicle 2110b, an XR device 2110c, a smartphone 2110d and/or a home appliance 2110e is connected to a cloud network 2100. The robot 2110a, the autonomous vehicle 2110b, the XR device 2110c, the smartphone 2110d, and/or the home appliance 2110e to which the AI technology is applied may be referred to as AI devices 2110a to 2110e.

The cloud network 2100 may refer to a network that forms part of a cloud computing infrastructure and/or resides in a cloud computing infrastructure. The cloud network 2100 may be configured using a 3G network, a 4G or LTE network, and/or a 5G network. That is, each of the devices 2110a to 2110e and 2120 consisting the AI system may be connected to each other through the cloud network 2100. In particular, each of the devices 2110a to 2110e and 2120 may communicate with each other through a base station, but may directly communicate with each other without using a base station.

The AI server 2120 may include a server for performing AI processing and a server for performing operations on big data. The AI server 2120 is connected to at least one or more of AI devices constituting the AI system, i.e. the robot 2110a, the autonomous vehicle 2110b, the XR device 2110c, the smartphone 2110d and/or the home appliance 2110e through the cloud network 2100, and may assist at least some AI processing of the connected AI devices 2110a to 2110e. The AI server 2120 can learn the ANN according to the machine learning algorithm on behalf of the AI devices 2110a to 2110e, and can directly store the learning models and/or transmit them to the AI devices 2110a to 2110e. The AI server 2120 may receive the input data from the AI devices 2110a to 2110e, infer the result value with respect to the received input data using the learning model, generate a response and/or a control command based on the inferred result value, and transmit the generated data to the AI devices 2110a to 2110e. Alternatively, the AI devices 2110a to 2110e may directly infer a result value for the input data using a learning model, and generate a response and/or a control command based on the inferred result value.

Various embodiments of the AI devices 2110a to 2110e to which the technical features of the present disclosure can be applied will be described. The AI devices 2110a to 2110e shown in FIG. 21 can be seen as specific embodiments of the AI device 2000 shown in FIG. 21.

The present disclosure can have various advantageous effects.

For example, when a UE which has received information block with validity timer value and stored the information block moves fast and the UE enters normal-/medium-/high mobility state, the UE may scale the validity timer value so that the validity timer can expire earlier than before. Therefore, the UE will delete the stored information block and receive the new information block from the new serving cell. If the stored information block is maintained longer, the UE may perform unnecessary procedure such as measurement even though the stored information block is not suitable for the new serving cell, as the fast moving UE may change the serving cell frequently.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
   receiving information for a validity timer from a network;
   starting the validity timer having a first time duration based on the information;
   while the validity timer is running, performing a measurement on one or more neighbor cells and performing cell reselections;
   determining a mobility state based on a number of the cell reselections;
   multiplying the first time duration by a scaling factor for the mobility state to obtain a second time duration, wherein the second time duration is longer than an elapsed time duration from when the validity timer is started to a time point the mobility state is determined;
   identifying a remaining time duration which equals to the second time duration minus the elapsed time duration;
   upon determining the mobility state, stopping the validity timer and starting another validity timer having the remaining time duration; and
   stopping the measurement upon an expiry of the another validity timer.

2. The method of claim 1, wherein the receiving of the information for the validity timer comprises:
   receiving a dedicated measurement configuration comprising the information for the validity timer via a dedicated signalling.

3. The method of claim 2, wherein the dedicated measurement configuration further comprises at least one of a frequency list or at least one scaling factor.

4. The method of claim 3, wherein the measurement is performed on at least one frequency included in the frequency list.

5. The method of claim 3, wherein the mobility state comprises at least one of a normal mobility state, a medium mobility state, or a high mobility state, and
   wherein the at least one scaling factor comprises:
   a first scaling factor for the normal mobility state;
   a second scaling factor for the medium mobility state; and
   a third scaling factor for the high mobility state, and
   wherein the third scaling factor is smaller than the second scaling factor, and the second scaling factor is smaller than the first scaling factor.

6. The method of claim 1, wherein the starting of the validity timer comprises starting the validity timer upon receiving the information for the validity timer.

7. The method of claim 1, wherein the second time duration is shorter than the first time duration.

8. The method of claim 2, further comprising:
   storing the dedicated measurement configuration; and
   after an expiry of the another validity timer:
   deleting the stored dedicated measurement configuration;
   receiving, from a serving cell to which a cell reselection is performed, a common measurement configuration comprising a frequency list via a broadcast signalling; and
   performing a measurement on at least one frequency in the frequency list included in the common measurement configuration.

9. The method of claim 1, wherein the wireless device is in communication with at least one of a user equipment, a network, or autonomous vehicles other than the wireless device.

10. A wireless device in a wireless communication system comprising:
    a transceiver;
    a memory; and
    at least one processor operatively coupled to the transceiver and the memory, and configured to:
    control the transceiver to receive information for a validity timer from a network;
    start the validity timer having a first time duration based on the information;
    while the validity timer is running, perform a measurement on one or more neighbor cells and perform cell reselections;
    determine a mobility state based on a number of the cell reselections;
    multiply the first time duration by a scaling factor for the mobility state to obtain a second time duration, wherein the second time duration is longer than an elapsed time duration from when the validity timer is started to a time point the mobility state is determined;
    identify a remaining time duration which equals to the second time duration minus the elapsed time duration;
    upon determining the mobility state, stop the validity timer and start another validity timer having the remaining time duration; and
    stop the measurement upon an expiry of the another validity timer.

11. A processor for a wireless device in a wireless communication system, wherein the processor is configured to control the wireless device to perform operations comprising:
    receiving information for a validity timer from a network;
    starting the validity timer having a first time duration based on the information;
    while the validity timer is running, performing a measurement on one or more neighbor cells and performing cell reselections;
    determining a mobility state based on a number of the cell reselections;
    multiplying the first time duration by a scaling factor for the mobility state to obtain a second time duration, wherein the second time duration is longer than an elapsed time duration from when the validity timer is started to a time point the mobility state is determined;
    identifying a remaining time duration which equals to the second time duration minus the elapsed time duration;
    upon determining the mobility state, stopping the validity timer and starting another validity timer having the remaining time duration; and stopping the measurement upon an expiry of the another validity timer.

* * * * *